(12) United States Patent
Kotani et al.

(10) Patent No.: US 10,982,345 B2
(45) Date of Patent: Apr. 20, 2021

(54) TIN-PLATED PRODUCT AND METHOD FOR PRODUCING SAME

(71) Applicants: DOWA METALTECH CO., LTD., Tokyo (JP); Yazaki Corporation, Tokyo (JP)

(72) Inventors: Hirotaka Kotani, Tokyo (JP); Hiroto Narieda, Tokyo (JP); Akira Sugawara, Tokyo (JP); Yuta Sonoda, Tokyo (JP); Yoshitaka Ito, Shizuoka (JP)

(73) Assignees: Dowa Metaltech Co., Ltd., Tokyo (JP); Yazaki Corporation, Tokyo (JP)

( * ) Notice: Subject to any disclaimer, the term of this patent is extended or adjusted under 35 U.S.C. 154(b) by 186 days.

(21) Appl. No.: 16/099,791

(22) PCT Filed: Apr. 18, 2017

(86) PCT No.: PCT/JP2017/015545
§ 371 (c)(1),
(2) Date: Nov. 8, 2018

(87) PCT Pub. No.: WO2017/199664
PCT Pub. Date: Nov. 23, 2017

(65) Prior Publication Data
US 2019/0136398 A1 May 9, 2019

(30) Foreign Application Priority Data

May 19, 2016 (JP) .............. JP2016-100211

(51) Int. Cl.
| C25D 5/50 | (2006.01) |
| C25D 5/12 | (2006.01) |
| C25D 7/00 | (2006.01) |
| B32B 15/01 | (2006.01) |
| C22F 1/16 | (2006.01) |
| C25D 3/30 | (2006.01) |
| H01R 13/03 | (2006.01) |
| H01R 43/16 | (2006.01) |

(52) U.S. Cl.
CPC .............. *C25D 5/505* (2013.01); *B32B 15/01* (2013.01); *C22F 1/16* (2013.01); *C25D 3/30* (2013.01); *C25D 5/12* (2013.01); *C25D 5/50* (2013.01); *C25D 7/00* (2013.01); *H01R 13/03* (2013.01); *H01R 43/16* (2013.01)

(58) Field of Classification Search
CPC . C25D 5/505; C25D 3/30; C25D 5/12; C25D 7/00; C25D 7/12; C25D 5/50; C22F 1/16
See application file for complete search history.

(56) References Cited

FOREIGN PATENT DOCUMENTS

| JP | 2000355791 A | 12/2000 |
| JP | 2010202903 A | 9/2010 |
| JP | 2012201932 A | 10/2012 |
| JP | 2013076122 A | 4/2013 |
| JP | 2013139640 A | 7/2013 |
| JP | 2014198889 A | 10/2014 |
| JP | 2014208904 A | 11/2014 |

OTHER PUBLICATIONS

English Translation of Narueda et al. (JP 2012-201932) (Oct. 22, 2012).*
International search report for application No. PCT/JP2017/015545 dated May 25, 2017.

* cited by examiner

*Primary Examiner* — Jessee R Roe
(74) *Attorney, Agent, or Firm* — Bachman & LaPointe, PC (57) ABSTRACT

After drying the surface of a tin plating layer having a thickness of 0.4 to 3 μm which is formed on a base material of copper or a copper alloy by electroplating at a current density of 5 to 13 A/dm$^2$ in a tin plating solution consisting of water, tin sulfate, sulfuric acid and a surfactant, the surface of the tin plating layer is heated to melt tin, and then, cooled to cause a layer of the tin plating layer on the side of the outermost surface to be a tin layer, which has a structure obtained by solidification after melting, while causing a layer of the tin plating layer between the tin layer and the base material to be a copper-tin alloy layer, to produce a tin-plated product wherein a tin layer, which has a structure obtained by solidification after melting, is formed on a copper-tin alloy layer formed on a base material of copper or a copper alloy and wherein the tin-plated product has a glossiness of 0.3 to 0.7.

9 Claims, 3 Drawing Sheets

TIN-PLATED PRODUCT AND METHOD FOR PRODUCING SAME

TECHNICAL FIELD

The present invention relates generally to a tin-plated product and a method for producing the same. More specifically, the invention relates to a tin-plated product used as the material of an insertable and extractable connecting terminal or the like, and a method for producing the same.

BACKGROUND ART

As conventional materials of insertable and extractable connecting terminals, there are used tin-plated products wherein a tin plating film is formed as the outermost layer of a conductive material, such as copper or a copper alloy. In particular, tin-plated products are used as the materials of information communication equipment for automotive vehicles, portable telephones and personal computers, control substrates for industrial equipment, such as robots, terminals, such as connectors, lead frames, relays and switches, and bus bars, from the points of view of their small contact resistance, contact reliability, corrosion resistance, solderability, economy and so forth.

Tin plating is generally carried out by electroplating. After electroplating, a reflow treatment (tin melting treatment) is carried out in order to remove the internal stress in tin-plated products to suppress the occurrence of whiskers. If the reflow treatment is thus carried out after tin plating, a part of tin diffuses to the components of the underlying layer to form a compound layer, and a tin or tin alloy layer is formed thereon.

As a tin-plated product produced by such a reflow treatment, there is proposed a tin-plated product wherein a pure tin layer is formed on a copper-tin compound layer formed on a base material of copper or a copper alloy, the thickness of the pure tin layer being in the range of from 0.3 µm to 1.5 µm, and wherein the average particle diameter of the copper-tin compound layer on a surface substantially parallel to the interfaces between the layers of the tin-plated product is 1.3 µm or more, the arithmetic average roughness Ra of the surface of the tin-plated product being 0.15 µm or more (see, e.g., Patent Document 1).

There are also proposed tin-plated products, such as a terminal for fitting type connector wherein a nickel layer, a copper-tin alloy layer and a tin layer are formed on a copper alloy bar in this order as the surface coating layers and wherein the tin layer is smoothed by a reflow treatment (see, e.g., Patent Document 2), a copper or copper alloy bar which has a reflowed tin plating layer wherein the specular reflectance of the surface thereof is in the range of from 25 to 65 (see, e.g., Patent Document 3) and an electrically conductive material for connecting parts wherein a tin coating layer is formed on a copper-tin alloy coating layer formed on the surface of a base material of a copper alloy bar and wherein the surface thereof is reflow-treated for causing a part of the copper-tin alloy layer to be exposed on the surface of the tin coating layer (see, e.g., Patent Document 4).

PRIOR ART DOCUMENT(S)

Patent Document(s)

Patent Document 1: Japanese Patent Laid-Open No. 2013-76122 (Paragraph Number 0013)
Patent Document 2: Japanese Patent Laid-Open No. 2013-139640 (Paragraph Numbers 0011-0016)
Patent Document 3: Japanese Patent Laid-Open No. 2014-198889 (Paragraph Number 0017)
Patent Document 4: Japanese Patent Laid-Open No. 2014-208904 (Paragraph Number 0007)

SUMMARY OF THE INVENTION

Problem to be Solved by the Invention

In each of the conventional tin-plated products proposed in Patent Documents 1-4, the hard tin-copper alloy layer is formed on the undersurface of the soft pure tin layer formed as the outermost layer by the reflow treatment, so that it is possible to suppress the exposure of the base material due to sliding when it is used as the material of an insertable and extractable connecting terminal or the like.

However, if such a tin-plated product is used as the material of terminals for automotive vehicles, there is a problem in that the outermost pure tin layer is easily worn away (minute sliding abrasion (fretting corrosion)) due to minute sliding) by sliding for a slight distance (of about 50 µm) between contact points of male and female terminals due to vibrations during vehicle travel (in which the terminal is held in a high-temperature environment), so that the contact reliability of the terminal is deteriorated by such a minute sliding abrasion. Particularly in the fitting type connecting terminal of the tin-plated product, if the contact load is decreased, the contact point is easily moved, so that it is difficult to suppress the minute sliding abrasion due to sliding for a slight distance.

It is therefore an object of the present invention to eliminate the aforementioned problems and to provide a tin-plated product which has an excellent minute sliding abrasion resistance property after it is held in a high-temperature environment, and a method for producing the same.

Means for Solving the Problem

In order to accomplish the aforementioned object, the inventors have diligently studied and found that it is possible to provide a tin-plated product which has an excellent minute sliding abrasion resistance property after it is held in a high-temperature environment, and a method for producing the same, if a tin-plated product, which has a tin layer formed on a copper-tin alloy layer formed on a base material of copper or a copper alloy, has a glossiness of 0.3 to 0.7. Thus, the inventors have made the present invention.

According to the present invention, there is provided a tin-plated product comprising: a base material of copper or a copper alloy; a copper-tin alloy layer formed on the base material; and a tin layer formed on the copper-tin alloy layer, wherein the tin-plated product has a glossiness of 0.3 to 0.7.

In this tin-plated product, the tin layer preferably has a structure obtained by solidification after melting. The outermost surface of the tin-plated product preferably has an arithmetic average roughness Ra of 0.05 to 0.20 µm, and preferably has an average height Rc of 0.1 to 1.0 µm. The outermost surface of the tin-plated product preferably has an oil reservoir depth Rvk of 0.03 to 0.20 µm, and preferably has a rough curve element average length RSm of 2 to 7 µm. In addition, a nickel layer or a nickel alloy layer is preferably formed between the base material and the copper-tin alloy layer, and a lubricant layer is preferably formed on the tin layer. Moreover, the tin layer is preferably formed on the whole surface of the copper-tin alloy layer.

According to the present invention, there is provided a method for producing a tin-plated product, the method comprising the steps of: forming a tin plating layer having a thickness of 0.4 to 3 μm on the surface of a base material of copper or a copper alloy by electroplating at a current density of 5 to 13 A/dm² in a tin plating bath consisting of water, tin sulfate, sulfuric acid and a surfactant; drying the surface of the tin plating layer; heating the dried surface of the tin plating layer to melt tin; and cooling the heated surface of the tin plating layer to cause a layer of the tin plating layer on the side of the outermost surface to be a tin layer, which has a structure obtained by solidification after melting, while causing a layer of the tin plating layer between the tin layer and the base material to be a copper-tin alloy layer. In this method for producing a tin-plated product, a lubricant is preferably applied on the tin layer to form a lubricant layer thereon.

According to the present invention, there is provided a terminal which uses the above-described tin-plated product as a material thereof.

Effects of the Invention

According to the present invention, it is possible to produce a tin-plated product which has an excellent minute sliding abrasion resistance property after it is held in a high-temperature environment even if a volatile lubricant is applied thereon.

MODE FOR CARRYING OUT THE INVENTION

Referring to the accompanying drawings, the preferred embodiment of a tin-plated product and a method for producing the same according to the present invention will be described below in detail.

Figure 1:
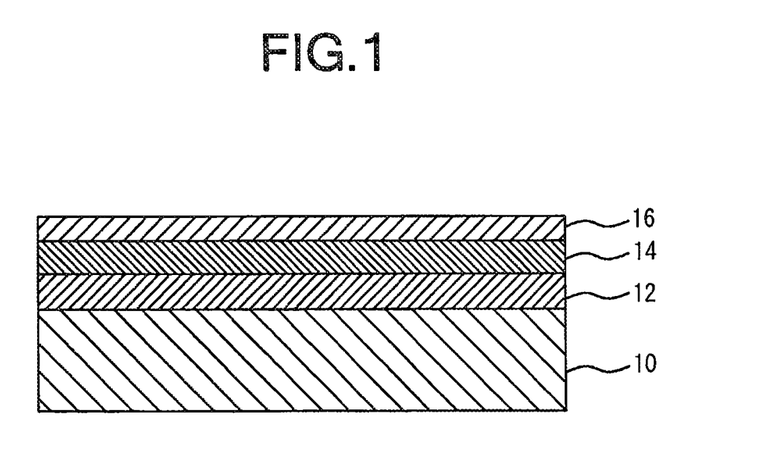
FIG. 1 is a sectional view schematically showing the preferred embodiment of a tin-plated product according to the present invention.

As shown in FIG. 1, in the preferred embodiment of a tin-plated product according to the present invention, a copper-tin alloy layer 12 is formed on a base material 10 of copper or a copper alloy, and a tin layer 14 is formed on the copper-tin alloy layer 12, (the outermost surface of) the tin-plated product having a glossiness of 0.3 to 0.7. This glossiness of the tin-plated product is less than the glossiness of conventional reflow-treated tin-plated products, and is in the range of from mat to semibright.

In this tin-plated product, the tin layer 14 is preferably a tin layer having a structure obtained by solidification after melting. The tin layer 14 is preferably formed on the whole surface of the copper-tin alloy layer 12. Furthermore, the copper-tin alloy layer 12 may be exposed on a part of the outermost surface of the tin-plated product.

On the tin layer 14, a lubricant layer 16 is preferably formed. If the lubricant layer 16 is thus formed on the tin layer 14, when the tin-plated product is used as the material of an insertable and extractable connecting terminal, it is possible to suppress the oxidation of abrasion powder due to the minute sliding abrasion to suppress the increase of the contact resistance to enhance the electrical connection reliability. In addition, even if the copper-tin alloy layer 12 is exposed due to the minute sliding abrasion, the oxidation of abrasion powder due to the minute sliding abrasion can be suppressed by the lubricant. If the glossiness of the surface of the tin-plated product is less than 0.3, the convex-concave (irregularity) of the surface thereof is too large. When a lubricant is applied on such a surface to form the lubricant layer 16 thereon, there is easily caused a difference between the strong and weak portions in the holding power of the lubricant layer 16. In the weak portion in the holding power, it is not possible to sufficiently obtain the effect of suppressing the oxidation of the abrasion powder due to the minute sliding abrasion, so that the minute sliding abrasion resistance property is easily deteriorated. On the other hand, if the glossiness exceeds 0.7, the convex-concave (irregularity) of the surface of the tin-plated product is too small (too flat). When a lubricant is applied on such a surface to form the lubricant layer 16 thereon, the holding power of the lubricant layer 16 is weak. For that reason, it is not possible to sufficiently obtain the effect of suppressing the oxidation of the abrasion powder due to the minute sliding abrasion, so that the minute sliding abrasion resistance property is easily deteriorated.

The arithmetic average roughness Ra of the outermost surface of the tin-plated product is preferably 0.05 to 0.20 μm and more preferably 0.09 to 0.18 μm. If the arithmetic average roughness Ra of the outermost surface of the tin-plated product is less than 0.05 μm, the convex-concave (irregularity) of the surface of the tin-plated product is too small (too flat). When a lubricant is applied on such a surface to form the lubricant layer 16 thereon, the holding power of the lubricant layer 16 is weak. For that reason, it is not possible to sufficiently obtain the effect of suppressing the oxidation of the abrasion powder due to the minute sliding abrasion, so that the minute sliding abrasion resistance property is easily deteriorated. On the other hand, if the arithmetic average roughness Ra of the outermost surface of the tin-plated product exceeds 0.20 μm, the convex-concave (irregularity) of the surface thereof is too large. When a lubricant is applied on such a surface to form the lubricant layer 16 thereon, there is easily caused a difference between the strong and weak portions in the holding power of the lubricant layer 16. In the weak portion in the holding power, it is not possible to sufficiently obtain the effect of suppressing the oxidation of the abrasion powder due to the minute sliding abrasion, so that the minute sliding abrasion resistance property is easily deteriorated.

The average height Rc of the outermost surface of the tin-plated product is preferably 0.1 to 1.0 μm and more preferably 0.1 to 0.7 μm. If the average height Rc of the outermost surface of the tin-plated product is less than 0.1 μm, the convex-concave (irregularity) of the surface of the tin-plated product is too small (too flat). When a lubricant is applied on such a surface to form the lubricant layer 16 thereon, the holding power of the lubricant layer 16 is weak. For that reason, it is not possible to sufficiently obtain the effect of suppressing the oxidation of the abrasion powder due to the minute sliding abrasion, so that the minute sliding abrasion resistance property is easily deteriorated. On the other hand, if the average height Rc of the outermost surface of the tin-plated product exceeds 1.0 μm, the convex-concave (irregularity) of the surface thereof is too large. When a lubricant is applied on such a surface to form the lubricant layer 16 thereon, there is easily caused a difference between the strong and weak portions in the holding power of the lubricant layer 16. In the weak portion in the holding power, it is not possible to sufficiently obtain the effect of suppressing the oxidation of the abrasion powder due to the minute sliding abrasion, so that the minute sliding abrasion resistance property is easily deteriorated.

The oil reservoir depth Rvk of the outermost surface of the tin-plated product is preferably 0.03 to 0.20 μm and more preferably 0.03 to 0.16 outermost surface of the tin-plated product is less than 0.03 μm, the oil reservoir depth Rvk of the outermost surface is too small. When a lubricant is applied on such a surface to form the lubricant layer 16 thereon, the holding power of the lubricant layer 16 is weak. For that reason, it is not possible to sufficiently obtain the effect of suppressing the oxidation of the abrasion powder due to the minute sliding abrasion, so that the minute sliding abrasion resistance property is easily deteriorated. On the other hand, if the oil reservoir depth Rvk of the outermost surface of the tin-plated product exceeds 0.20 μm, the oil reservoir depth Rvk of the outermost surface is too large. When a lubricant is applied on such a surface to form the lubricant layer 16 thereon, there is easily caused a difference between the strong and weak portions in the holding power of the lubricant layer 16. In the weak portion in the holding power, it is not possible to sufficiently obtain the effect of suppressing the oxidation of the abrasion powder due to the minute sliding abrasion, so that the minute sliding abrasion resistance property is easily deteriorated.

The rough curve element average length RSm of the outermost surface of the tin-plated product is preferably 2 to 7 μm. If the rough curve element average length RSm of the outermost surface of the tin-plated product is less than 2 μm, the width of the convex-concave (irregularity) of the surface of the tin-plated product is too narrow. When a lubricant is applied on such a surface to form the lubricant layer 16 thereon, it is not possible to apply the lubricant in the recessed portions of the surface without a break, so that the holding power of the lubricant layer 16 is weak. For that reason, it is not possible to sufficiently obtain the effect of suppressing the oxidation of the abrasion powder due to the minute sliding abrasion, so that the minute sliding abrasion resistance property is easily deteriorated. On the other hand, if the rough curve element average length RSm of the outermost surface of the tin-plated product exceeds 7 μm, the width of the convex-concave (irregularity) of the surface of the tin-plated product is too wide, so that there is easily caused a difference between the strong and weak portions in the holding power of the lubricant layer 16. In the weak portion in the holding power, it is not possible to sufficiently obtain the effect of suppressing the oxidation of the abrasion powder due to the minute sliding abrasion, so that the minute sliding abrasion resistance property is easily deteriorated.

Furthermore, the thickness of the tin layer 14 is preferably 0.2 to 1.5 μm. Thus, if the outermost surface of the tin-plated product has the convex-concave (irregularity) having a predetermined size to increase the amount of the lubricant which can be held therein, it is possible to further improve the minute sliding abrasion resistance property of the tin-plated product after it is held in a high-temperature environment.

In the preferred embodiment of a method for producing a tin-plated product according to the present invention, a tin plating layer having a thickness of 0.4 to 3 μm is formed on the surface of a base material of copper or a copper alloy by electroplating at a current density of 5 to 13 A/dm² in a tin plating bath consisting of water, tin sulfate, sulfuric acid and a surfactant, and the surface of the tin plating layer is dried. Thereafter, the dried surface of the tin plating layer is heated to melt tin, and then, cooled to cause a layer of the tin plating layer on the side of the outermost surface to be a tin layer 14, which has a structure obtained by solidification after melting, while causing a layer of the tin plating layer between the tin layer 14 and the base material 10 to be a copper-tin alloy layer 12. Furthermore, as the surfactant, there may be used a nonionic surfactant, an anionic surfactant or an amphoteric surfactant.

In this method for producing a tin-plated product, a lubricant is preferably applied on the tin layer 14 to form a lubricant layer 16 thereon. As the lubricant, there may be used a lubricant prepared by mixing a base oil, such as a paraffin mineral oil, a naphthenic mineral oil or a synthetic oil, with any one of various additives for lubricant. As such a lubricant, there may be used a pressing oil which is used for pressing. When such a pressing oil is used, even if another lubricant is not applied, it can be utilized as it is, without removing the pressing oil used for the pressing of the tin-plated product. The pressing oil may be applied on the tin layer 14 to form the lubricant layer 16. If the pressing oil is thus applied, the tin-plated product can be pressed as it is (without using another pressing oil), and it is not necessary to carry out cleaning after pressing.

The tin plating bath is preferably an aqueous solution containing 60 to 80 g/L of tin sulfate, 65 to 85 g/L of sulfuric acid and 1 to 3 mL/L of a surfactant.

Before the tin plating layer is formed on the base material 10, a nickel plating layer (or a nickel alloy plating layer) may be formed on the base material 10, and a copper plating layer may be formed on the nickel plating layer (or the nickel alloy plating layer), so that a nickel plating layer (or a nickel alloy plating layer) may be formed as an underlying layer between the base material 10 and the copper-tin alloy layer 12.

EXAMPLES

Examples of a tin-plated product and a method for producing the same according to the present invention will be described below in detail.

Example 1

First, as a base material (a material to be plated), there was prepared a conductive rolled sheet of a Cu—Ni—Sn alloy (a base material of a copper alloy comprising 1.0% by weight of nickel, 0.9% by weight of tin, 0.05% by weight of phosphorus and the balance being copper, the base material having an arithmetic average roughness Ra of 0.133 μm and a maximum height Ry of 1.042 μm) (NB-109-EH produced by DOWA METALTECH CO., LTD.) having a size of 50 mm×50 mm×0.25 mm. Then, as a pretreatment, the base material was electrolytic-degreased, and then, washed with water. Thereafter, the base material was pickled, and then, washed with water.

Then, the pretreated base material and a tin electrode plate were used as a cathode and an anode, respectively, to electroplate the base material at a current density of 5 A/dm² and a liquid temperature of 25° C. for 45 seconds in a tin plating bath of an aqueous solution containing 70 g/L of tin sulfate ($SnSO_4$), 75 g/L of sulfuric acid ($H_2SO_4$) and 2 g/L of a polyoxyethylene stearylamine (anionic surfactant) serving as a surfactant to form a tin plating layer on the base material. The thickness of the tin plating layer was measured by means of an X-ray fluorescent analysis thickness meter (SFT3300S produced by Seiko Nanoscience Inc.) (in an analyzing range of 0.5 m$\phi$ for an analyzing time of 15 seconds by exciting method). As a result, the thickness of the tin plating layer was 1 µm.

After a tin-plated product producing produced by thus forming the tin plating layer on the base material was washed with water and dried, a reflow treatment (tin melting treatment) was carried out. In this reflow treatment, a near-infrared heater (HYW-8N produced by HYBEC CORPORATION, rated voltage=100 V, rated power=560 W) was used for heating the tin-plated product at a current value of 10.8 A, which was set by means of a power controller (HYW-20CCR-$\alpha$ N produced by HYBEC CORPORATION), for 11 seconds in the atmosphere to melt the surface of the tin plating layer. Immediately after melting the surface of the tin plating layer, the tin-plated product was immersed in a water tank at 20° C. to be cooled.

The outermost surface of the tin-plated product thus produced was observed at a magnification of 5,000 by means of a scanning ion microscope (SIM) attached to a focused ion beam processing-observing device (JIB-4000 produced by JEOL Ltd.) In addition, after carbon (C) was deposited on the outermost surface of the tin-plated product so as to have a thickness of about 1 µm, the tin-plated product was cut by a focused ion beam (FIB) using the above-described focused ion beam processing-observing device to expose a cross-section perpendicular to the rolling direction of the base material. Then, the exposed cross-section was observed at a magnification of 10,000 by means of the above-described scanning ion microscope (SIM). The surface and cross-section of the tin-plated product were thus observed to obtain the SIM images thereof. From the obtained SIM images of the surface and cross-section of the tin-plated product, it was confirmed that the outermost layer of the tin-plated product was a pure tin layer and that a copper-tin alloy layer of a copper-tin alloy having a thickness of about 0.6 µm was formed on the underside thereof (on the side of the base material). The thickness of the pure tin layer and the thickness of the copper-tin alloy layer were measured by means of an electrolytic film thickness meter (TH11 produced by CHUO SEISAKUSHO LTD.) on the basis of the electrolytic test method of JIS H8501. As a result, the thickness of the pure tin layer was 0.5 µm.

As the surface roughness of the tin-plated product thus produced, the arithmetic average roughness Ra and the maximum height Ry, which were parameters exhibiting the surface roughness on the basis of ISO4287-1997, were calculated from the results of measurements using a contact surface roughness measuring apparatus (Surfcoder SE4000 produced by Kosaka Laboratory Ltd.), and the rough curve element average length RSm (the average length RSm of a rough curve element), the average height Rc and the oil reservoir depth Rvk (the depth of a groove part dislocated from an effective load roughness Rk of an oil reservoir), which were parameters exhibiting the surface roughness on the basis of JIS B0601 (2001), were calculated from the results of measurements using a laser microscope (Laser Microscope VK-X100 produced by KEYENCE CORPORATION). As a result, the arithmetic average roughness Ra was 0.166 µm, and the maximum height Ry was 1.125 µm. The rough curve element average length RSm was 3.48 µm, the average height Rc was 0.66 µm, and the oil reservoir depth Rvk was 0.12 µm.

The glossiness of the tin-plated product was measured in parallel to the rolling direction of the base material by means of a densitometer (Densitometer ND-1 produced by NIPPON DENSHOKU INDUSTRIES CO., LTD.). As a result, the glossiness was 0.42.

As a base material (a material to be plated), there is prepared a material of a Cu—Ni—Sn alloy (NB-109-EH produced by DOWA METALTECH CO., LTD.) having a thickness of 0.25 mm and a width of 250 mm. Then, the base material was electroplated at a current density of 9 A/dm$^2$ in a tin plating bath of an aqueous solution containing 70 g/L of tin sulfate (SnSO$_4$), 75 g/L of sulfuric acid (H$_2$SO$_4$), 30 g/L of cresolsulfonic acid serving as a leveling agent and 2 g/L of a polyoxyethylene stearylamine (anionic surfactant) serving as a surfactant by means of a continuous plating line of a reel-to-reel system to form a tin plating layer having a thickness of 1 µm on the base material to produce a tin-plated product. Then, a reflow treatment, in which the tin-plated product was immersed in a water tank at 20° C. to be cooled immediately after the surface of the tin plating layer was melted by heating the tin plating layer at 700° C. for 6.5 seconds, was carried out to prepare a reflow-treated tin-plated product.

Then, a test piece cut off from the reflow-treated tin-plated product was used as a plate test piece (a test piece serving as a male terminal). In addition, 0.3 mg/cm$^2$ of a non-chlorine low-viscosity pressing oil (Unipress PA5 produced by JX Nippon Oil & Energy Corporation) serving as a lubricant (for plastic working, such as pressing or cutting) was applied on the surface of the tin-plated product produced in this embodiment. Then, a test piece cut off from the tin-plated product, on which the lubricant was applied, was indented (embossed in semi-spherical shape of R=1 mm) to be used as an indented test piece (a test piece serving as a female terminal). After the indented test piece and the plate test piece were held at 120° C. for 120 hours in a constant temperature bath (ETTAS OF450 produced by AS ONE Corporation) under the atmosphere, the indented test piece and the plate test piece were taken out. Then, the plate test piece was fixed on the stage of a precision sliding testing apparatus (CRS-G2050-DWA type produced by Yamasaki-Seiki Co., Ltd.), and the indent of the indented test piece was caused to contact the surface of the plate test piece. Then, there was carried out a sliding test wherein the stage fixing thereon the plate test piece was reciprocally slid at a sliding speed of one reciprocation per one second in a range of one way of 50 µm in horizontal directions while the indented test piece was pressed against the surface of the slotted plate test piece at a load of 0.7 N. As a result, the base material was not exposed even if the test piece was slid 1000 reciprocating times. Thus, it was found that the tin-plated product produced in this embodiment has an excellent minute sliding abrasion resistance property.

Example 2

A tin-plated product was produced by the same method as that in Example 1, except that the tin plating layer was formed by electroplating at a current density of 10 A/dm$^2$ for 21 seconds. Furthermore, the thickness of the tin plating layer was measured by the same method as that Example 1. As a result, the thickness of the tin plating layer was 1 µm.

Figure 2:
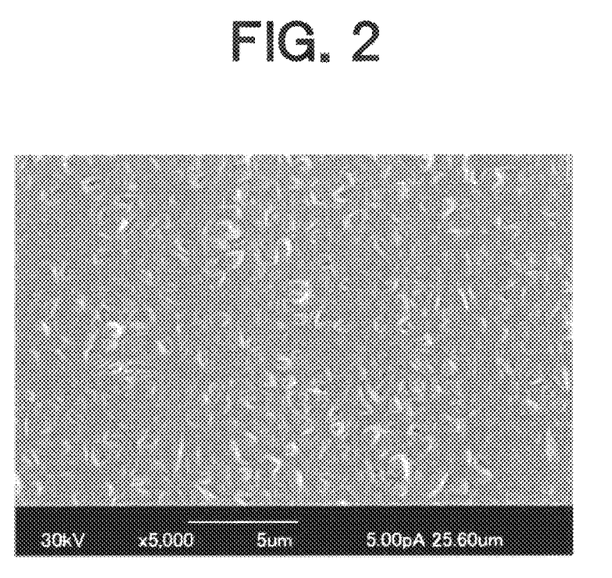
FIG. 2 is a scanning ion micrograph (SIM image) of the surface of a tin-plated layer obtained in Example 2.
Figure 3:
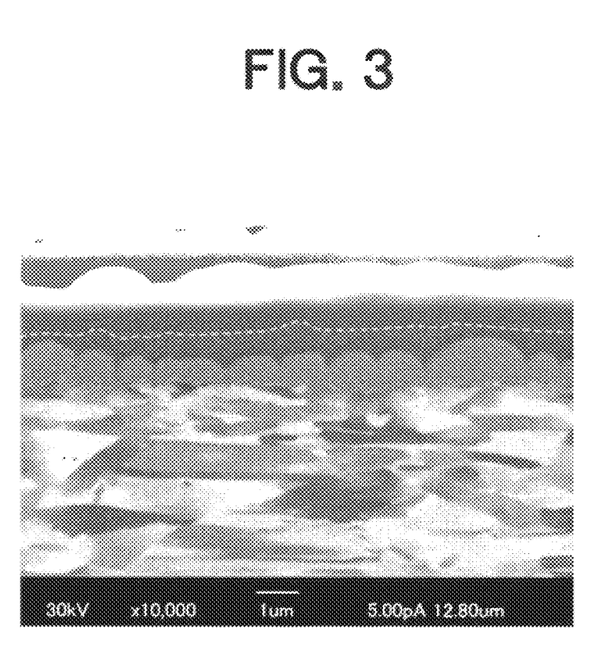
FIG. 3 is a SIM image of a cross-section of the tin plating layer obtained in Example 2.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The SIM images of the surface and cross-section of this tin-plated product are shown in FIGS. 2 and 3, respectively. Furthermore, with respect to layers above and below the dotted line in FIG. 3, the layer above the dotted line is a layer (protective film) of carbon deposited when the tin-plated product was cut off, and the layer below the dotted line is the pure layer. The thickness of the pure tin layer and the thickness of the copper-tin alloy layer were measured by the same method as that in Example 1. As a result, the thickness of the pure tin layer was 0.5 µm, and the thickness of the copper-tin alloy layer was about 0.6 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.104 µm, and the maximum height Ry was 0.622 µm. The rough curve element average length RSm was 2.13 µm, the average height Rc was 0.16 µm, and the oil reservoir depth Rvk was 0.06 µm. The glossiness of the tin-plated product was measured by the same method as that in Example 1. As a result, the glossiness was 0.52. The sliding test was carried out by the same method as that in Example 1. As a result, the base material was not exposed even if the test piece was slid 1000 reciprocating times. Thus, it was found that the tin-plated product produced in this embodiment has an excellent minute sliding abrasion resistance property.

Example 3

A tin-plated product was produced by the same method as that in Example 1, except that the tin plating layer was formed by electroplating at a current density of 12 A/dm² for 18 seconds. Furthermore, the thickness of the tin plating layer was measured by the same method as that Example 1. As a result, the thickness of the tin plating layer was 1 µm.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The thickness of the pure tin layer and the thickness of the copper-tin alloy layer were measured by the same method as that in Example 1. As a result, the thickness of the pure tin layer was 0.5 µm, and the thickness of the copper-tin alloy layer was about 0.6 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.092 µm, and the maximum height Ry was 0.786 µm. The rough curve element average length RSm was 2.33 µm, the average height Rc was 0.13 µm, and the oil reservoir depth Rvk was 0.04 µm. The glossiness of the tin-plated product was measured by the same method as that in Example 1. As a result, the glossiness was 0.59. The sliding test was carried out by the same method as that in Example 1. As a result, the base material was not exposed even if the test piece was slid 1000 reciprocating times. Thus, it was found that the tin-plated product produced in this embodiment has an excellent minute sliding abrasion resistance property.

Example 4

A tin-plated product was produced by the same method as that in Example 1, except that the tin plating layer was formed by electroplating for 20 seconds. Furthermore, the thickness of the tin plating layer was measured by the same method as that Example 1. As a result, the thickness of the tin plating layer was 0.5 µm.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The thickness of the pure tin layer and the thickness of the copper-tin alloy layer were measured by the same method as that in Example 1. As a result, the thickness of the pure tin layer was 0.2 µm, and the thickness of the copper-tin alloy layer was about 0.5 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.176 µm, and the maximum height Ry was 1.336 µm. The rough curve element average length RSm was 4.86 µm, the average height Rc was 0.30 µm, and the oil reservoir depth Rvk was 0.15 µm. The glossiness of the tin-plated product was measured by the same method as that in Example 1. As a result, the glossiness was 0.31. The sliding test was carried out by the same method as that in Example 1. As a result, the base material was not exposed even if the test piece was slid 1000 reciprocating times. Thus, it was found that the tin-plated product produced in this embodiment has an excellent minute sliding abrasion resistance property.

Example 5

The same base material as that in Example 1 was prepared. Then, as a pretreatment, the base material was electrolytic-degreased, and then, washed with water. Thereafter, the base material was pickled, and then, washed with water.

Then, the pretreated base material (the material to be plated) and a nickel electrode plate were used as a cathode and an anode, respectively, to electroplate the base material at a current density of 4 A/dm² and a liquid temperature of 50° C. for 40 seconds in a nickel plating solution containing 80 mL/L of nickel sulfamate and 45 g/L of boric acid to form a nickel plating layer on the base material.

Then, the base material after the nickel plating, and a copper electrode plate were used as a cathode and an anode, respectively, to electroplate the material at a current density of 4 A/dm² and a liquid temperature of 25° C. for 50 seconds in a copper plating solution containing 110 g/L of copper sulfate and 100 mL/L of sulfuric acid to form a copper plating layer on the nickel plating layer.

Then, a tin plating layer was formed on the copper plating layer to produce a tin-plated product by the same method as that in Example 1, except that the tin plating layer was formed by electroplating for 30 seconds. Furthermore, the thickness of each of the nickel plating layer, the copper plating layer and the tin plating layer was measured by the same method as that Example 1 for measuring the tin plating layer. As a result, the thickness of the nickel plating layer was 0.3 µm, the thickness of the copper plating layer was 0.3 µm, and the thickness of the tin plating layer was 0.7 µm.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The thickness of the pure tin layer and the thickness of the copper-tin alloy layer were measured by the same method as that in Example 1. As a result, the thickness of the pure tin layer was 0.3 µm, and the thickness of the copper-tin alloy layer was about 0.6 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.126 µm, and the maximum height Ry was 0.964 µm. The rough curve element average length RSm was 5.31 µm, the average height Rc was 0.49 µm, and the oil reservoir depth Rvk was 0.08 µm. The glossiness of the tin-plated product was measured by the same method as that in Example 1. As a result, the glossiness was 0.45. The sliding test was carried out by the same method as that in Example 1. As a result, the base material was not exposed even if the test piece was slid 1000 reciprocating times. Thus, it was found that the tin-plated product produced in this embodiment has an excellent minute sliding abrasion resistance property.

Example 6

A tin-plated product was produced by the same method as that in Example 1, except that the tin plating layer was formed by electroplating for 100 seconds. Furthermore, the thickness of the tin plating layer was measured by the same method as that Example 1. As a result, the thickness of the tin plating layer was 2.3 µm.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The thickness of the pure tin layer and the thickness of the copper-tin alloy layer were measured by the same method as that in Example 1. As a result, the thickness of the pure tin layer was 1.5 µm, and the thickness of the copper-tin alloy layer was about 0.6 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.157 µm, and the maximum height Ry was 1.147 µm. The rough curve element average length RSm was 4.40 µm, the average height Rc was 0.56 µm, and the oil reservoir depth Rvk was 0.09 µm. The glossiness of the tin-plated product was measured by the same method as that in Example 1. As a result, the glossiness was 0.69. The sliding test was carried out by the same method as that in Example 1. As a result, the base material was not exposed even if the test piece was slid 1000 reciprocating times. Thus, it was found that the tin-plated product produced in this embodiment has an excellent minute sliding abrasion resistance property.

Comparative Example 1

First, as a base material (a material to be plated), there was prepared a material of a Cu—Ni—Sn alloy (NB-109-EH produced by DOWA METALTECH CO., LTD.) having a thickness of 0.25 mm and a width of 250 mm. Then, a tin-plated product was produced by the same method as that in Example 1, except that a tin plating layer was formed by electroplating at a current density of 9 A/dm² in a tin plating bath of an aqueous solution containing 70 g/L of tin sulfate (SnSO₄), 75 g/L of sulfuric acid (H₂SO₄), 30 g/L of cresol-sulfonic acid serving as a leveling agent and 2 g/L of a polyoxyethylene stearylamine (anionic surfactant) serving as a surfactant by means of a continuous plating line of a reel-to-reel system. Furthermore, the thickness of the tin plating layer was measured by the same method as that Example 1. As a result, the thickness of the tin plating layer was 1 µm.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The thickness of the pure tin layer and the thickness of the copper-tin alloy layer were measured by the same method as that in Example 1. As a result, the thickness of the pure tin layer was 0.6 µm, and the thickness of the copper-tin alloy layer was about 0.5 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.021 µm, and the maximum height Ry was 0.300 µm. The rough curve element average length RSm was 1.90 µm, the average height Rc was 0.02 µm, and the oil reservoir depth Rvk was 0.01 µm. The glossiness of the tin-plated product was measured by the same method as that in Example 1. As a result, the glossiness was 1.60. The sliding test was carried out by the same method as that in Example 1. As a result, the base material was exposed after the test piece was slid 143 reciprocating times. Thus, it was found that the minute sliding abrasion resistance property of the tin-plated product produced in this comparative embodiment was not good.

Comparative Example 2

A tin-plated product was produced by the same method as that in Example 1, except that the tin plating layer was formed by electroplating at a current density of 4 A/dm² for 55 seconds. Furthermore, the thickness of the tin plating layer was measured by the same method as that Example 1. As a result, the thickness of the tin plating layer was 1 µm.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The thickness of the pure tin layer and the thickness of the copper-tin alloy layer were measured by the same method as that in Example 1. As a result, the thickness of the pure tin layer was 0.5 µm, and the thickness of the copper-tin alloy layer was about 0.6 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.379 µm, and the maximum height Ry was 2.743 µm. The rough curve element average length RSm was 7.43 µm, the average height Rc was 1.66 µm, and the oil reservoir depth Rvk was 0.26 µm. The glossiness of the tin-plated product was measured by the same method as that in Example 1. As a result, the glossiness was 0.22. The sliding test was carried out by the same method as that in Example 1. As a result, the base material was exposed after the test piece was slid 373 reciprocating times. Thus, it was found that the minute sliding abrasion resistance property of the tin-plated product produced in this comparative embodiment was not good.

Comparative Example 3

A tin-plated product was produced by the same method as that in Example 1, except that the tin plating layer was formed by electroplating at a current density of 14 A/dm$^2$ for 15 seconds. Furthermore, the thickness of the tin plating layer was measured by the same method as that Example 1. As a result, the thickness of the tin plating layer was 1 µm.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The thickness of the pure tin layer and the thickness of the copper-tin alloy layer were measured by the same method as that in Example 1. As a result, the thickness of the pure tin layer was 0.5 µm, and the thickness of the copper-tin alloy layer was about 0.6 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.091 µm, and the maximum height Ry was 0.743 µm. The rough curve element average length RSm was 1.53 µm, the average height Rc was 0.03 µm, and the oil reservoir depth Rvk was 0.01 µm. The glossiness of the tin-plated product was measured by the same method as that in Example 1. As a result, the glossiness was 0.72. The sliding test was carried out by the same method as that in Example 1. As a result, the base material was exposed after the test piece was slid 605 reciprocating times. Thus, it was found that the minute sliding abrasion resistance property of the tin-plated product produced in this comparative embodiment was not good.

Comparative Example 4

A tin-plated product was produced by the same method as that in Example 1, except that the tin plating layer was formed by electroplating for 15 seconds. Furthermore, the thickness of the tin plating layer was measured by the same method as that Example 1. As a result, the thickness of the tin plating layer was 0.3 µm.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The thickness of the pure tin layer and the thickness of the copper-tin alloy layer were measured by the same method as that in Example 1. As a result, the thickness of the pure tin layer was 0.1 µm, and the thickness of the copper-tin alloy layer was about 0.3 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.186 µm, and the maximum height Ry was 1.447 µm. The rough curve element average length RSm was 6.72 µm, the average height Rc was 1.02 µm, and the oil reservoir depth Rvk was 0.12 µm. The glossiness of the tin-plated product was measured by the same method as that in Example 1. As a result, the glossiness was 0.20. The sliding test was carried out by the same method as that in Example 1. As a result, the base material was exposed after the test piece was slid 161 reciprocating times. Thus, it was found that the minute sliding abrasion resistance property of the tin-plated product produced in this comparative embodiment was not good.

Comparative Example 5

A tin-plated product was produced by the same method as that in Example 1, except that the tin plating layer was formed by electroplating for 100 seconds. Furthermore, the thickness of the tin plating layer was measured by the same method as that Example 1. As a result, the thickness of the tin plating layer was 3.2 µm.

With respect to the tin-plated product thus produced, the surface and cross-section thereof were observed by the same method as that in Example 1. As a result, it was confirmed that the outermost layer was a pure tin layer and that a copper-tin alloy layer of a copper-tin alloy was formed on the underside thereof (on the side of the base material). The thickness of the pure tin layer and the thickness of the copper-tin alloy layer were measured by the same method as that in Example 1. As a result, the thickness of the pure tin layer was 2.3 µm, and the thickness of the copper-tin alloy layer was about 0.6 µm. The arithmetic average roughness Ra, the maximum height Ry, the rough curve element average length RSm, the average height Rc and the oil reservoir depth Rvk were calculated by the same methods as those in Example 1. As a result, the arithmetic average roughness Ra was 0.209 µm, and the maximum height Ry was 1.930 µm. The rough curve element average length RSm was 1.90 µm, the average height Rc was 0.02 µm, and the oil reservoir depth Rvk was 0.01 µm. The glossiness of the tin-plated product was measured by the same method as that in Example 1. As a result, the glossiness was 0.71. The sliding test was carried out by the same method as that in Example 1. As a result, the base material was exposed when the test piece was slid reciprocating times of less than 1000 times. Thus, it was found that the minute sliding abrasion resistance property of the tin-plated product produced in this comparative embodiment was not good.

The producing conditions and characteristics of the tin-plated products in these Examples and Comparative Examples are shown in Tables 1 and 2.

TABLE 1

|  | Tin Plating | | |
| --- | --- | --- | --- |
|  | Thickness (µm) | Current Density (A/dm$^2$) | Leveling Agent |
| Example 1 | 1 | 5 | — |
| Example 2 | 1 | 10 | — |
| Example 3 | 1 | 12 | — |
| Example 4 | 0.5 | 5 | — |
| Example 5 | 0.7 | 5 | — |
| Example 6 | 2.3 | 5 | — |
| Comp. 1 | 1 | 9 | cresolsulfonic acid |
| Comp. 2 | 1 | 4 | — |
| Comp. 3 | 1 | 14 | — |
| Comp. 4 | 0.3 | 5 | — |
| Comp. 5 | 3.2 | 5 | — |

TABLE 2

|  | Thickness of Sn (μm) | Surface Roughness (μm) | | | | | Glossiness | Sliding Number at the time of Exposure of Base Material |
|---|---|---|---|---|---|---|---|---|
|  |  | Ra | Ry | RSm | Rc | Rvk |  |  |
| Ex. 1 | 0.5 | 0.166 | 1.125 | 3.48 | 0.66 | 0.12 | 0.42 | >1000 |
| Ex. 2 | 0.5 | 0.104 | 0.662 | 2.13 | 0.16 | 0.06 | 0.52 | >1000 |
| Ex. 3 | 0.5 | 0.092 | 0.786 | 2.33 | 0.13 | 0.04 | 0.59 | >1000 |
| Ex. 4 | 0.2 | 0.176 | 1.336 | 4.86 | 0.30 | 0.15 | 0.31 | >1000 |
| Ex. 5 | 0.3 | 0.126 | 0.964 | 5.31 | 0.49 | 0.08 | 0.45 | >1000 |
| Ex. 6 | 1.5 | 0.157 | 1.147 | 4.40 | 0.56 | 0.09 | 0.69 | >1000 |
| Comp. 1 | 0.6 | 0.021 | 0.300 | 1.90 | 0.02 | 0.01 | 1.60 | 143 |
| Comp. 2 | 0.5 | 0.379 | 2.743 | 7.43 | 1.66 | 0.26 | 0.22 | 373 |
| Comp. 3 | 0.5 | 0.091 | 0.743 | 1.53 | 0.03 | 0.01 | 0.72 | 605 |
| Comp. 4 | 0.1 | 0.186 | 1.447 | 6.72 | 1.02 | 0.13 | 0.20 | 161 |
| Comp. 5 | 2.3 | 0.209 | 1.930 | 1.90 | 0.02 | 0.01 | 0.71 | <1000 |

DESCRIPTION OF REFERENCE NUMBERS

10 Base Material
12 Copper-Tin Alloy Layer
14 Tin Layer
16 Lubricant Layer

The invention claimed is:

1. A tin-plated product comprising:
   a base material of copper or a copper alloy;
   a copper-tin alloy layer formed on the base material; and
   a tin layer formed on the copper-tin alloy layer,
   wherein the tin-plated product has a glossiness of 0.3 to 0.7, and
   wherein the outermost surface of the tin-plated product has an average height Rc of 0.1 to 1.0 μm.

2. A tin-plated product as set forth in claim 1, wherein said tin layer has a structure obtained by solidification after melting.

3. A tin-plated product as set forth in claim 1, wherein the outermost surface of said tin-plated product has an arithmetic average roughness Ra of 0.05 to 0.20 μm.

4. A tin-plated product as set forth in claim 1, wherein the outermost surface of said tin-plated product has an oil reservoir depth Rvk of 0.03 to 0.20 μm.

5. A tin-plated product as set forth in claim 1, wherein the outermost surface of said tin-plated product has a rough curve element average length RSm of 2 to 7 μm.

6. A tin-plated product as set forth in claim 1, which further comprises a nickel layer or a nickel alloy layer, the nickel layer or the nickel alloy layer being formed between said base material and said copper-tin alloy layer.

7. A tin-plated product as set forth in claim 1, which further comprises a lubricant layer formed on the tin layer.

8. A tin-plated product as set forth in claim 1, wherein said tin layer is formed on the whole surface of said copper-tin alloy layer.

9. A terminal which uses a tin-plated product as set forth in claim 1, as a material thereof.

* * * * *